A. MITCHELL.
MOVABLE SUGAR-CARRIER.
No. 173,038. Patented Feb. 1, 1876.
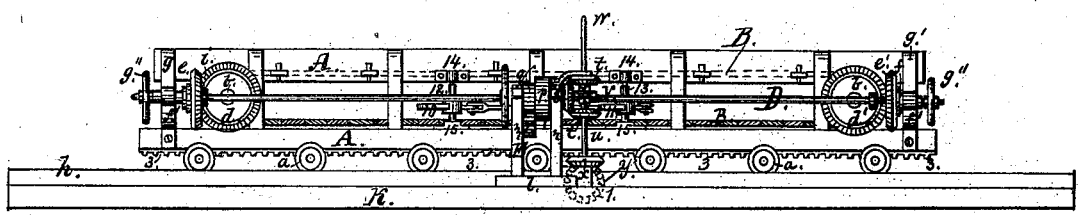
Witnesses:
J. C. Hubbell
P. J. Roach
Inventor:
Archibald Mitchell
By H. K. Jenkins
Attorney

UNITED STATES PATENT OFFICE.

ARCHIBALD MITCHELL, OF NEW ORLEANS, LOUISIANA, ASSIGNOR TO LEEDS & CO., OF SAME PLACE.

IMPROVEMENT IN MOVABLE SUGAR-CARRIERS.

Specification forming part of Letters Patent No. 173,038, dated February 1, 1876; application filed August 20, 1875.

*To all whom it may concern:*

Be it known that I, ARCHIBALD MITCHELL, a resident of the city of New Orleans and State of Louisiana, have invented a certain new and useful Improvement in Movable Carriers; and I do hereby declare the following to be a full, clear, and correct description of the same, reference being had to the annexed drawing making a part of this specification.

My invention relates to the construction and arrangement of a movable carrier, which is designed more especially for use in connection with the apparatus and machinery employed in the Robert diffusion process for extracting saccharine matter from sugar-cane and other substances, and thereby simplify and reduce the cost of working the same.

This movable carrier differs from all others with which I am acquainted, inasmuch as it will discharge its load at various points of delivery at the discretion of the operator. It is also capable of delivering from either end, as will hereinafter be described.

My invention will be readily understood by referring to the drawing, whereon Figure 1 is a front elevation, Fig. 2 a rear elevation, and Fig. 3 a top view or plan, of the same.

A is a substantial frame of timber, mounted upon wheels or rollers, as shown at $a\ a'$, &c., in order that it may be moved endwise in either direction. Between the sides of this frame a carrier, B, is operated over drums, which are secured to their respective shafts $b\ b'$, journaled in boxes $c\ c'$, the latter secured to the frame A near its outer end, as shown. C C are regulating-screws, by means of which the boxes $c\ c'$ may be adjusted before being secured to the frame, so as to secure a proper tension for the carrier B.

Upon what I shall designate as the front ends of the shafts $b\ b'$ is rigidly keyed or otherwise secured the bevel wheels $d\ d'$, which are alternately operated by their pinions $e\ e'$, the two latter loosely fitted upon the horizontal shaft D, the ends of which are provided with sleeves $f$, having an endwise movement upon and revolving with the said shaft in the bearings of the brackets $f'\ f'$, secured to the uprights $g\ g'$ of the frame A, as shown. The inner ends of these sleeves are provided with conical heads made to fit into recesses sunk into the rear of the pinions $e\ e'$, so that either of the said pinions may, by friction, be thrown into gear by simply turning the nut $g''$ upon its end of the shaft D until the said nut presses the cone of the sleeve with which it is brought in contact into the recess of its pinion, driving the latter forward until its teeth engage those of its bevel-wheel. To prevent the pinions $e\ e'$ being pressed too far forward the shaft D is provided with collars, as at $i\ i'$.

The wheels $a$ of the carrier-frame rest and are operated upon a pair of rails, $h\ h'$, both of which are securely fastened upon a bed-plate or platform, $k$, to which is also secured, at a point about half-way between the distance traversed by the frame A, a stand, E, which consists of a base-plate, $l$, and two uprights, $m\ n$. The tops of the latter are on a line with the center of the horizontal shaft D, upon which is loosely fitted, between the uprights of the stand, a cog-wheel, $o$, the hub of which is made sufficiently long to fill up the space between the two uprights of the stand, in order that it may not have any lateral play. In the said hub is tapped a set-screw, the end or point of which enters a keyway or groove, 2, that is cut the whole length of the shaft D; so that, while the said shaft may move freely back and forth in the cog-wheel, the rotary motion of the latter will be imparted to the former, and, through its end gear, operate the carrier B.

Near the outer edge of the top of the uprights $m\ n$ is a second set of bearings for the reception of the journals of the main shaft, which is provided between the uprights with a pulley, $p$, and pinion $q$, the latter imparting motion to the cog-wheel $o$ through an intermediate pinion, $r$, fitted to an independent shaft. $s$ is a bevel-pinion keyed to one end of the main shaft, so as to engage a pair of bevel-pinions, $t\ t'$, that are loosely fitted to a vertical shaft, $u$, upon which is secured, between the pinions aforesaid, an ordinary feathered coupling, $v$, which may be made to engage either the upper or lower wheel by shifting the lever $w$. Upon this vertical shaft, and near the foot thereof, is keyed or otherwise secured a pinion, $x$, which meshes into another like wheel, $y$, giving motion, through the shaft $z$ of the latter, to a cog-wheel, 1, located between the tracks. This cog-wheel, engaging a rack, 3, secured on a central line to the bottom of and running the whole length of the frame A, enables the latter to be moved back and forth whenever desired.

At Fig. 2 a means is shown by which the frame A may be moved by hand independently of the gearing heretofore described. It consists of a cog-wheel, 4, which runs loose on a pin, 5, secured to the side of the movable frame. The teeth of this wheel mesh into a rack, 6, fastened to the side of one of the rails, as shown. Motion is imparted to this wheel from the hand-wheel 7 through a pinion, 8, which is secured upon the inner side of the said hand-wheel, the two latter running loosely upon a pin, 9.

The shaft D is prevented from bending or springing at its center by the supporting-arms 10 11, secured to vertical shafts 12 13, the ends of which operate in boxes 14 15 that are secured to the front of the carrier-frame A, as shown. The hubs of the supporting-arms 10 11 are provided in their rear with short arms, to which is secured, as shown in dotted lines at Fig. 3, the ends of a connecting-rod, 16, in order that the movement of the one will be dependent upon that of the other.

The operation of this portion of my invention will be better understood by supposing the carrier-frame A to be moving in the direction shown by the arrow 17. As soon as the supporting-arm 10, which is shown as projecting outward, is brought in contact with the nearest upright of the gearing-stand, it naturally swings back clear of the said stand, while the second arm 11 is, through the connecting-rod 16, made to swing outward to act as a support for the shaft D until the return of the frame, when the latter arm is swung back and the former becomes the supporting one.

When used in connection with the diffusion process a series of carriers should be arranged so as to convey the sugar-canes to the hoppers located above the movable carrier, where they are brought into contact with knives which cut them into thin slices. The said slices, falling on my movable carrier, are by it conveyed and delivered, at the will of the operator, into either of the diffusion-vessels, which should, for convenience, be located between and beneath the rails upon which my movable carrier operates.

Having described my invention, what I claim as new, and desire to secure by Letters Patent, is—

1. The frame A, provided with an endless carrier, B, and wheels $a$ $a'$, &c., as and for the purposes herein stated.

2. The horizontal shaft D, provided with keyway 2, pinions $e$ $e'$, sleeves $f$ $f$, brackets $f'$ $f'$, nuts $g''$ $g''$, and collars $i$ $i'$, in combination with the bevel-wheels $d$ $d'$, carrier B, and frame A, the whole being arranged to operate as and for the purposes herein set forth.

3. In combination with the horizontal shaft D, the keyed cog-wheel $o$, driving-pulley $p$, and intermediate pinions $q$ and $r$, all arranged to operate the carrier B, as herein stated.

4. In combination with the frame A and rack 3, the gearing-stand E, lever $w$, coupling $v$, bevel-pinions $s$ $t$ $t$ $x$ $y$, vertical shaft $u$, and horizontal shaft $z$ and cog-wheel 1, all arranged to operate as herein described.

5. The reversible supports 10 11, constructed and applied to the frame A, so as to operate in the manner herein described.

6. In combination with the frame A, the hand-wheel 7, pinion 8, cog-wheel 4, and rack 6, all arranged to operate as and for the purposes herein specified.

ARCHIBALD MITCHELL.

Witnesses:
H. N. JENKINS,
T. J. ROACH.